United States Patent Office 3,186,904
Patented June 1, 1965

3,186,904
FUNGICIDAL SULPHONES AND SULPHOXIDES
Herbert Aubrey Stevenson, John Ray Marshall, and Anthony Frederick Hams, Nottingham, England, assignors to Boots Pure Drug Company Limited, Nottingham, England, a company of Great Britain
No Drawing. Filed Jan. 15, 1962, Ser. No. 166,369
Claims priority, application Great Britain, Feb. 3, 1961, 4,177/61
22 Claims. (Cl. 167—30)

This invention relates to fungicidal compositions and to methods for the control of fungi.

Plant pathogenic fungi can in many instances cause considerable loss of agricultural and horticultural crops and many compounds are in current use for controlling such fungi in order to diminish this loss. However the compounds presently available are by no means completely adequate, owing to the great variation of crops and fungi pathogenic thereto, and the search for more effective fungicides continues. In spite of the considerable amount of research and experimentation towards this end, it is not possible to forecast the value of untested compounds as agricultural and horticultural fungicides. The fact that the fungicides must not deleteriously affect the crops adds considerably to the difficulty of obtaining satisfactory products.

It is an object of the present invention to provide novel fungicidal compositions and methods of controlling the growth of fungi pathogenic to agricultural and horticultural crops. It is a further important object of the invention to provide novel fungicidal compositions which combine high, wide spectrum fungicidal activity with low phytotoxicity, and low mammalian toxicity.

According to one feature of the present invention there are provided fungicidal compositions which comprise a compound of the general Formula I

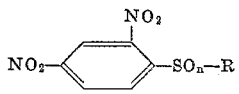

wherein $n$ represents 1 or 2 and (a) when $n=1$, R represents a radical selected from alkyl containing 5–7 carbon atoms, cycloalkyl, phenylalkyl, phenylalkyl in which the phenyl nucleus contains one or more substituents selected from halogen atoms and nitro groups, phenyl and phenyl which contains one or more substituents selected from halogen atoms, nitro, alkyl, alkoxy and alkoxycarbonyl groups; (b) when $n=2$, R represents a radical selected from alkyl, halogenated methyl, halogenated propyl, cycloalkyl, phenylalkyl and phenylalkyl in which the phenyl nucleus contains one or more substituents selected from halogen atoms and nitro groups; in association with an inert fungicidal adjuvant.

The compounds of the above general Formula I are either sulphoxides ($n=1$) or sulphones ($n=2$), these compounds containing the groupings

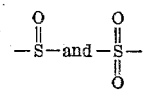

respectively. Unless otherwise defined, the terms "alkyl" and "cycloalkyl" used in the definition of compounds of general Formula I are intended to mean such radicals containing up to seven carbon atoms.

We have found that compounds of general Formula I possess high fungicidal activity against a wide range of fungi which are pathogenic to horticultural and agricultural crops, and that these compounds are virtually non-phytotoxic to a wide variety of crops. Thus, for example, they are fungicidal against Venturia spp., Phytophthora spp., genera of the family Peronosporaceae, Cladosporium spp., Alternaria spp., Septoria spp., Botrytis spp., Sclerotinia spp., and Gloeosporium spp., and substantially non-phytotoxic towards apples, pears, tomatoes, potatoes, vines, celery, broad beans, french beans, and roses. Accordingly they are of value for the treatment of such diseases as apple scab (*Venturia inaequalis*), pear scab (*Venturia pirina*), potato blight (*Phytophthora infestans*), downy mildew (*Plasmopora viticola*) on vines, and early blight (*Alternaria solani*) of potatoes, celery leaf spot (*Septoria apii*), chocolate spot (*Botrytis fabae*) on broad beans, brown rot (*Sclerotinia fructicola*) of stone fruits, tomato leaf mould (*Cladosporium fulvum*) and bitter rot of apples and fruit tree canker (*Gloeosporium perennans*). This list is given by way of example only and is not intended to limit the invention.

The term "inert fungicidal adjuvant" used in this specification is to be interpreted as meaning any diluent or carrier which may be used for the formulation of fungicidal compounds for the treatment of horticultural and agricultural crops or the ground in which the crops are growing or are to be grown. Typical adjuvants include dispersing agents, emulsifying agents, wetting agents, pulverulent solid dusting powders, volatile propellants and ignitable slow-burning compositions.

The compositions of the invention may take a variety of forms and include dusting powders, dispersions, emulsions, smokes and aerosols. In particular the dispersions and emulsions may be supplied to the consumer as such and at the required concentration of active material or they be supplied as primary compositions which require the addition of water either to dilute them to the desired concentration of active ingredient or actually to form the dispersion or emulsion. The invention includes both the primary and the final compositions.

The concentration of the active material in the primary compositions which may be provided for the preparation of any of the forms in which the compositions of the present invention may be used may vary widely. For example the amount of active material present in a finely ground dispersible powder may be limited to less than 50% if the active material has a relatively low melting point and tends to melt in the grinding and mixing process. On the other hand if it has a relatively high melting point a dispersible powder containing up to 90% or more of the active material may be prepared satisfactorily. Restrictions depending on the physical properties of the active ingredient also apply in the case of e.g., solutions and emulsions, etc. When preparing the primary compositions the practicability of making highly concentrated mixtures, i.e., mixtures containing up to 90% or more of the active material must be considered for it is obviously desirable to supply the consumer with a mixture having as high a concentration as is possible. It would be uneconomical to apply the primary compositions in their concentrated forms and it is preferred to apply mixtures containing less than 20% of the active material. For very light applications mixtures containing 0.001% of the active ingredient may be used but generally the preferred compositions for application in the field contain from 0.05 to 10% of the active ingredient.

When compositions of the present invention are provided as dusting powders they comprise one or more of the active compounds having the foregoing general Formula I intimately mixed with a pulverulent solid diluent, the mixture containing up to 90% w./w. of the active component.

As dispersions, the compositions of the present invention comprise essentially one or more of the active compounds having the foregoing general formula dispersed in an aqueous medium. It is convenient to supply the consumer with a primary composition which may be diluted with water to form a dispersion having the desired concentration; the primary composition may be in any one of the following forms.

It may be provided as a dispersible powder comprising the active ingredient and a suspending or dispersing agent which powder forms a dispersion when mixed with water.

In another form the primary composition may be supplied as a solution of the active ingredient in a water-miscible solvent, e.g., acetone with a dispersing agent which solution forms a dispersion when diluted with water.

A further primary composition comprises an active compound having the foregoing general formula in the form of a finely ground powder in association with a dispersing agent and intimately mixed with water to give a paste or cream which forms a dispersion when diluted with water.

The above-mentioned cream or paste comprising a finely ground active ingredient may be added to an emulsion of oil in water to give yet another type of primary composition which is a dispersion of the active compound in an aqueous oil emulsion, which may be further diluted with water before use.

The compositions of the present invention which are provided as emulsions consist essentially of one or more of the active compounds having the foregoing general formula dissolved in a solvent which is formed into an emulsion in the presence of an emulsifying agent with water. An emulsion of the desired concentration may be formed from a primary composition and the primary composition may be in one of the following forms.

It may be supplied as a concentrated stock emulsion which comprises an active ingredient having the foregoing general formula in combination with an emulsifying agent, water and an organic solvent for example xylene or another aromatic solvent boiling within the range 80–300° C.

Another primary composition suitable for preparing emulsions may consist of the active ingredient in an organic solvent and mixed with an emulsifying agent so that an emulsion is formed when the primary composition is diluted with water.

The aerosol compositions of the present invention include (1) a solution of an active ingredient in a volatile solvent such as acetone, together with, if desired, a small amount of a non-volatile oil such as a vegetable oil and (2) a solution of an active ingredient in a high boiling aromatic solvent; if the solubility of the active ingredient in this solvent is low, it may be necessary to add a supplementary solvent such as cyclohexanone or acetone. Such compositions are readily dispersed as aerosols either by mechanical means or by incorporating therein a volatile propellant such as Freon (a mixture of chlorofluoro derivatives of methane and ethane).

Compositions suitable for the generation of fungicidal smokes comprise a compound of the foregoing general Formula I in association with an ignitable slow-burning composition so that a smoke containing the active ingredient is generated when the composition is ignited. Thus such compositions may contain a fuel, for example sucrose, a source of oxygen, for example potassium chlorate, and a dampener, for example kaolin, to control the rate of burning.

In addition to the ingredients already mentioned the compositions of the invention may also contain other substances conventionally used in the art, the function of which may be to improve the handleability of the compositions or to improve their utility. For example an inert diluent such as kaolin may be used in the formulation for the preparation of a dispersible powder in order to facilitate mixing of the components and to provide sufficient bulk for mixing with water. As a further example the compositions intended for dilution with water prior to application may also contain a wetting agent in order to ensure satisfactory coverage of the leaves of the plants or trees to be treated. Also when dusts are prepared a lubricant such as magnesium stearate may be added to the mixture to promote both easier mixing of the components and to ensure that the final product has free flowing properties. Conventional "stickers," such as polyvinyl alcohol, colloid-like materials, e.g., silicic acid, bentonite, casein etc., may also be included in the compositions of the invention to improve the persistance of the fungicide after application.

The compositions hereinbefore described wherein the active ingredients are present in solid form, e.g., dusting powders and dispersible powders, should preferably contain the active ingredients in the form of very fine particles; the majority of the particles, of the order of at least 95%, should be less than $50\mu$, with about 75% of them being $5–20\mu$. The adjuvants conventionally used in such compositions are generally of this particle size, or smaller. The compositions can be prepared by means of conventional grinding equipment such as a hammer mill.

Other insecticides and fungicides such as D.D.T., benzene hexachloride, dinocap, dinoseb dimethacrylate, and sulphur may be incorporated in the compositions of the invention before application to the plants.

According to a further feature of the invention there is provided a process for controlling the growth of fungi on a crop which comprises treating a material selected from the crop and the soil in which the crop is to grow with a fungicidally effective amount of a compound of the foregoing general Formula I. In this specification the terms "crops" includes agricultural and horticultural plants either in their dormant or growing phases.

The method of using the compositions of the invention is dependent on many variables such as the particular fungus to be controlled, the severity of infection, the crop species to be treated and its environment, the size of the plants or trees etc., such variables influencing the application rate. Variation of method of application and application rate is well-known in the art of fungal control by chemical means and it is further known that absolutely rigid rates to suit all circumstances are impossible to define. However in general, application of the compositions of the invention at rates equivalent to about 0.2–100 lbs. of active ingredient per acre gives satisfactory results. For application to foliage, rates of 0.2–8 lbs. active ingredient per acre as a spray will normally be sufficient. For the control of many foliage fungi, such as for example *Venturia inaequalis,* rates of 0.5–2 lbs. active ingredient per acre as a spray are frequently sufficient. Dusting powder application rates will normally be higher, within the aforesaid 0.2–100 lbs./acre range.

The compounds of general Formula I which we have found to possess outstanding value as fungicides for use in horticulture and agriculture all contain a 2,4-dinitrophenyl nucleus, attached either to a sulphoxide group or to a sulphone group. These characteristics would appear to be necessary for high fungicidal activity as will be seen on comparing the results of experiments described hereafter using compounds of general Formula I and a representative selection of closely related compounds falling outside the scope of the invention. The nature of the radical R, which is attached to the sulphoxide or sulphone group, additionally influences the value of the compounds as plant fungicides; outside the definitions of R in general Formula I as previously described, diminished fungicidal activity and/or increased crop phytotoxicity becomes evident, as will be seen from a study of experimental results hereinafter described.

It is known from Swiss patent specification No. 262,191 that diphenyl compounds of the general formula

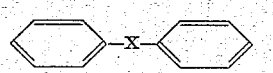

(II)

in which X represents sulphur or a sulphur containing group, e.g., SO, $SO_2$, S or SS, and in which the phenyl group may bear substituents for example halogen atoms, copper, mercury, sulpho, nitro, nitroso or ether groups, are fungicides. It is further stated in this Swiss patent specification that especially active fungicides are obtained by substitution at the 4- and 4,4'-positions. However the extremely high, wide spectrum activity and substantial non-phytotoxicity of the compounds of the aforementioned general Formula I, which are the active ingredients of the compositions of the present invention, could not have been predicted from Swiss patent specification No. 262,191. Although this patent specification includes within its very broad definition of active agents some of the compounds of general Formula I, there is no specific disclosure of this latter type of compound and the specification gives no indication that such a group of narrowly defined compounds would be markedly superior to closely related compounds such as those that are specifically mentioned in the Swiss specification.

It is also known from Summary Tables of Biological Tests, February 1954, page 10, that beta-chloroethyl 2,4-dinitrophenyl sulphoxide is active at 10 p.p.m. in a spore germination test against *Stemphylium sarcinaeforme* and *Sclerotinia fructicola*. No details are given of the effect of this compound on living plants. In fact examination of this substance has revealed that it is too phytotoxic to plants for it to have any practical value as a fungicide in agriculture and horticulture.

The following list of compounds which is given by way of example only and is not to be interpreted as limiting the invention in any way, is representative of the compounds of the foregoing general Formula I which may constitute active ingredients of the invention.

2,4-DINITROPHENYL X SULPHOXIDE

X=n-pentyl, M.P. 66–69° C.
n-hexyl, M.P. 63–65° C.
n-heptyl, M.P. 74–76° C.
3-methylbutyl, M.P. 67–68° C.
cyclopentyl, M.P. 119° C.
cyclohexyl, M.P. 140° C.
benzyl
p-chlorobenzyl, M.P. 152–153° C.
p-nitrobenzyl, M.P. 184–186° C.
phenyl
p-chlorophenyl, M.P. 144–145° C.
p-bromophenyl, M.P. 138–140° C.
p-fluorophenyl, M.P. 117–118° C.
p-tolyl, M.P. 131–134° C.
p-nitrophenyl, M.P. 163–164° C.
m-nitrophenyl, M.P. 210–212° C.
4-bromo-3-nitrophenyl, M.P. 180–182° C.
4-chloro-3-nitrophenyl, M.P. 182–185° C.
2-chloro-4-methylphenyl, M.P. 145–148° C.
2-chloro-5-methylphenyl, M.P. 210–212° C.
2,5-dichlorophenyl, M.P. 216–220° C.
2,5-dichloro-x-nitrophenyl, M.P. 238–242° C.
p-methoxyphenyl, M.P. 150–152° C.
o-methoxycarbonylphenyl
p-methoxycarbonylphenyl, M.P. 133–135° C.
p-methoxycarbonyl-x-nitrophenyl, M.P. 240–242° C.

2,4-DINITROPHENYL Y SULPHONE

Y=methyl
ethyl
n-propyl
iso-propyl
n-butyl
iso-butyl
sec-butyl
n-pentyl
3-methylbutyl, M.P. 121–122° C.
1-methylbutyl, M.P. 117–118° C.
n-hexyl
n-heptyl
cyclopentyl, M.P. 180–181° C.
cyclohexyl
dichloromethyl, M.P. 150–152° C.
dibromomethyl, M.P. 158–160° C.
3-chloropropyl, M.P. 80–81° C.
benzyl
p-nitrobenzyl, M.P. 229–232° C.
p-chlorobenzyl, M.P. 184–185° C.

Many of the compounds falling within general Formula I have not previously been described; in the above list melting points of such compounds are given. The new compounds are prepared by methods similar to those known for the old compounds.

The listing of the above compounds is not meant to indicate that they are all of equal value for the control of fungi on agricultural and horticultural crops. The control of such fungi is desirable from both the protectant point of view and the eradicant point of view. That is to say it is desirable that a fungicide be capable of controlling the growth of fungi when applied to the crop either a few days before or a few days after infection takes place, as well as when application and infection take place on the same day.

The compounds of general Formula I have been studied against several fungi and the preferred compounds in so far as degree of fungicidal activity is concerned include (*a*) the sulphones (i.e., $n=2$) in which R is an alkyl, halogenated methyl or halogenated propyl radical, alkyl containing 3–6 carbon atoms being most preferred, and (*b*) the sulphoxides (i.e., $n=1$) in which R is a phenyl or substituted phenyl radical. As a result of considerable investigation into comparative degrees of activity, spectrum of activity, and protectant and eradicant abilities, the most preferred compounds include the sulphones wherein R is n-butyl, n-pentyl and isobutyl and the sulphoxides wherein R is p-methoxycarbonyl-phenyl and p-tolyl. These five compounds are not necessarily of equal value.

The compounds of general Formula I have been shown to have high fungicidal activity in tests carried out in the following manner:

On a glass slide a deposit of known weight of the compound under test is formed by allowing 0.25 ml. of an acetone solution of known concentration of the compound to evaporate. Spores of *Venturi inaequalis* in aqueous suspension are set on these deposits (0.05 ml. of a 50,000 spores/ml. suspension) to germinate and after 18 hours' incubation the percentage germination is noted.

In the following tables the results of these tests are shown, the "approximate L.D. 50" being the concentration in parts per million of the acetone solution of the substance under test which it is estimated would inhibit 50% of the spores from germinating; the higher the value of the L.D. 50, the lower the activity of the compound. It should be noted that when a result is quoted as $<2$, $<4$ etc., this means that this concentration is the least used in the test and that on further testing a figure of $<1$ or $<0.5$ may be obtained.

This test measures the ability of a compound to control the fungus. Without this ability at low concentration, a compound is not likely to be of outstanding value for the control of fungi or plants. However, as later results will indicate, this type of test merely separates the compounds of no value from the compounds of possible value. It cannot be said that all compounds showing a very small L.D. 50 in this test are definitely valuable for the control of fungi on plants. Stability on the leaf, persistence, inactivation by the plant, phytotoxicity and many other factors must be considered and two compounds with identical L.D. 50's of a low order may behave quite differently on plants. The compounds of general Formula I have been examined in this way, as later results indicate.

*Table I.*—In this table are shown the results obtained using a representative selection of compounds falling within general Formula I, and which may be used according to the present invention:

*Table I*

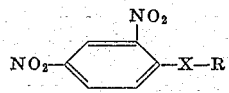

| X | R | Type of R | Approximate L.D. 50 |
|---|---|---|---|
| SO | n-pentyl | C₅₋₇ alkyl | <2 |
| | n-hexyl | | <2 |
| | n-heptyl | | <2 |
| | 3-methylbutyl | | 3 |
| SO | cyclopentyl | cycloalkyl | 3 |
| | cyclohexyl | | 6 |
| SO | benzyl | phenylalkyl | <2 |
| SO | p-chlorobenzyl | | 3 |
| SO | p-nitrobenzyl | | <2 |
| SO | phenyl | phenyl | 3 |
| SO | p-chlorophenyl | | <2 |
| SO | p-bromophenyl | | <2 |
| SO | p-fluorophenyl | | <2 |
| SO | p-tolyl | | <2 |
| SO | p-nitrophenyl | | <2 |
| SO | m-nitrophenyl | | 3 |
| SO | 4-bromo-3-nitrophenyl | | <2 |
| SO | 4-chloro-3-nitrophenyl | | 2 |
| SO | 2-chloro-4-methylphenyl | | <2 |
| SO | 2-chloro-5-methylphenyl | | <2 |
| SO | 2,5-dichloro-x-nitrophenyl | | <2 |
| SO | 2,5-dichlorophenyl | | <2 |
| SO | 2,4-dinitrophenyl | | 6 |
| SO | p-methoxyphenyl | | <2 |
| SO | o-methoxycarbonylphenyl | | 3 |
| SO | p-methoxycarbonylphenyl | | <2 |
| SO | p-methoxycarbonyl-x-nitrophenyl | | <2 |

*Table I—Continued*

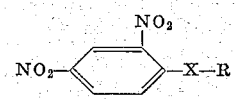

| X | R | Type of R | Approximate L.D. 50 |
|---|---|---|---|
| SO₂ | methyl | alkyl | <2 |
| SO₂ | ethyl | | <2 |
| SO₂ | n-propyl | | <2 |
| SO₂ | iso-propyl | | <2 |
| SO₂ | n-butyl | | 3 |
| SO₂ | iso-butyl | | <2 |
| SO₂ | sec-butyl | | <2 |
| SO₂ | n-pentyl | | <2 |
| SO₂ | 3-methylbutyl | | 4 |
| SO₂ | 1-methylbutyl | | 6 |
| SO₂ | n-hexyl | | 6 |
| SO₂ | n-heptyl | | 6 |
| SO₂ | cyclopentyl | cycloalkyl | <2 |
| SO₂ | cyclohexyl | | 2 |
| SO₂ | dichloromethyl | haloalkyl | <2 |
| SO₂ | dibromomethyl | | <2 |
| SO₂ | 3-chloropropyl | | 2 |
| SO₂ | benzyl | phenylalkyl | 6 |
| SO₂ | p-nitrobenzyl | | 7 |

*Table II.*—In this table are shown the results obtained using several compounds closely related to but distinct from the compounds of general Formula I. These compounds are all sulphoxides or sulphones attached to a radical W which falls within the definition of R in general Formula I, but they do not contain the 2,4-dinitrophenyl radical which is an essential feature of the compounds of the invention. The compounds listed are a representative selection of the large number of compounds of this type which have been examined. Those marked * are either specifically mentioned in or covered by the general formula of Swiss Patent No. 262,191 which has been discussed hereinbefore.

*Table II*

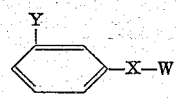

| Y | X | W | Type of W | Approximate L.D. 50 |
|---|---|---|---|---|
| p-NO₂ | SO | benzyl | phenylalkyl | >300 |
| p-NO₂ | SO₂ | do | | >300 |
| o-NO₂ | SO | do | | >300 |
| o-NO₂ | SO₂ | do | | >300 |
| p-NO₂ | SO | p-chlorobenzyl | | >300 |
| p-NO₂ | SO₂ | do | | >300 |
| H | SO | phenyl* | phenyl | 50 |
| p-NO₂ | SO | p-nitrophenyl* | | >300 |
| p-NO₂ | SO | p-chlorophenyl* | | >300 |
| p-NO₂ | SO | p-tolyl* | | >300 |
| o-NO₂ | SO | p-chlorophenyl | | 70 |
| 2,4,6-(NO₂)₃ | SO | p-tolyl* | | 50 |
| 4-Cl-2,6-(NO₂)₂ | SO | phenyl* | | 70 |
| m-NO₂ | SO₂ | methyl | alkyl | 60 |
| m-NO₂ | SO₂ | n-pentyl | | >300 |
| p-NO₂ | SO₂ | t-butyl | | >300 |
| p-NO₂ | SO₂ | 1-methylbutyl | | >300 |
| 4-CH₃-3-NO₂ | SO₂ | n-propyl | | >300 |
| 4-CH₃-3-NO₂ | SO₂ | iso-butyl | | >300 |
| 4-CH₃-3-NO₂ | SO₂ | 3-methylbutyl | | >300 |
| 4-Cl-3-NO₂ | SO₂ | ethyl | | 50 |
| 4-Cl-3-NO₂ | SO₂ | n-propyl | | >300 |
| 4-Cl-3-NO₂ | SO₂ | n-butyl | | >300 |
| 4-Cl-3-NO₂ | SO₂ | 3-methylbutyl | | >300 |
| 4-Cl-3-NO₂ | SO₂ | n-pentyl | | 70 |
| p-NO₂ | SO₂ | dibromomethyl | haloalkyl | 50 |
| p-NO₂ | SO₂ | dichloromethyl | | >80 |
| p-NO₂ | SO₂ | 3-chloropropyl | | >300 |
| p-NO₂ | SO₂ | 1-chloroethyl | | >300 |

*Table III.*—More compounds are included which are closely related to but distinct from the compounds of general Formula I. In this case, the compounds possess the characteristics of the compounds of the invention in so far as the 2,4-dinitro and W radicals are concerned, but in place of the sulphoxide or sulphone groups, there is a sulphide or disulphide group. The compounds listed are a representative selection of the large number of compounds of this type which have been examined. Those marked * are either specifically mentioned in or covered by the general formula of Swiss Patent No. 262,191.

Table III

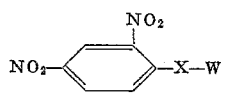

| X | W | Type of W | Approximate L.D. 50 |
|---|---|---|---|
| S | benzyl | phenylalkyl | >400 |
| S | p-chlorobenzyl | | >400 |
| S | p-nitrobenzyl | | >400 |
| S | p-chlorophenyl* | phenyl | >400 |
| S | p-nitrophenyl* | | 80 |
| S | p-tolyl* | | >400 |
| S | 2,5-dichlorophenyl* | | 80 |
| S | 2,4-dinitrophenyl* | | 80 |
| S | o-methoxycarbonyl* | | 80 |
| S | p-methoxycarbonyl* | | 80 |
| S-S | p-tolyl* | | >80 |
| S-S | 2,4,6-trichlorophenyl* | | >80 |
| S | methyl | alkyl | >80 |
| S | n-propyl | | >80 |
| S | n-butyl | | >80 |
| S | sec-butyl | | >80 |
| S | n-pentyl | | >80 |
| S | n-hexyl | | >80 |
| S-S | n-pentyl | | 50 |
| S | beta-chloroethyl | haloalkyl | 20 |
| S | beta-bromoethyl | | 80 |
| S | cyclohexyl | cycloalkyl | >80 |

As stated before, the compounds of general Formula I are substantially non-phytotoxic to a wide variety of agricultural and horticultural plants. Thus the compounds previously listed in Table I have been found to be suitable for application to plants in conventional spraying programme routines. The difficulty of finding high fungicidal activity and low phytotoxicity in a compound is illustrated by the results shown in Table IV. Some of the compounds therein listed showed high fungicidal activity in the spore germination test hereinbefore described, but on being applied to plants they caused sufficient damage to render their use to control fungi on plants impossible. The close similarity of these compounds to those falling within the invention is to be noted.

Table IV

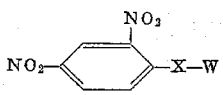

| X | W | Approximate L.D. 50 | Effect on tomatoes |
|---|---|---|---|
| SO | methyl | <4 | Damage. |
| SO | ethyl | <2 | Do. |
| SO | n-propyl | <2 | Do. |
| SO | n-butyl | >80 | Do. |
| SO | iso-butyl | <2 | Do. |
| SO | beta-chloroethyl | 6 | Do. |
| SO₂ | do | 10 | Do. |

*Table V.*—The compounds herein listed, although possessing the 2,4-dinitrophenyl nucleus and either the sulphoxide or sulphone group do not fall within general Formula I; these results are shown to illustrate further the unpredictability of the properties of the compounds of the invention.

Table V

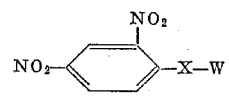

| X | W | Approximate L.D. 50 |
|---|---|---|
| SO₂ | p-tolyl | >400 |
| SO₂ | p-carboxyphenyl | 80 |
| SO | o-carboxyphenyl | 80 |
| SO | p-carboxyphenyl | 80 |
| SO₂ | n-octyl | 50 |
| SO₂ | n-decyl | >80 |
| SO₂ | n-dodecyl | >80 |
| SO₂ | 3,5,5-trimethylhexyl | >80 |
| SO₂ | beta-phenoxyethyl | 50 |

The compounds of general Formula I have been subjected to intensive study to ascertain their value for the control of fungi on growing crops. Thus, for example, a series of trials have been carried out in the greenhouse as follows:

Groups of young plants were sprayed with an aqueous dispersion of the compounds under test, six plants per treatment and 100 ml. of spray for the six plants. The concentration of active agent in the spray was usually 0.05% or less, equivalent to 1 lb. active ingredient per acre. The plants were inoculated with the fungus under study by spraying them with an aqueous spore suspension and were then maintained in a humidity chamber for 48 hours to allow the spores to germinate, if allowed to by the chemical. They were then kept in the greenhouse for 7–21 days, depending on the fungus and at the end of this time an assessment of the fungicidal effect of each treatment was carried out by a careful quantitative examination of the area of leaf damage and comparison of treated plants with untreated control plants. Three types of such test were:

(a) Routine: The plants were inoculated with the fungal spores as soon as dry after spraying with the chemical.

(b) Protectant: Spraying took place some time before inoculation. Thus P–2 indicates that inoculation took place two days after spraying, P–3 three days after, and so on.

(c) Eradicant: Spraying took place some time after inoculation. Thus E+2 means that spraying took place two days after inoculation.

Fungi and crop plants used included *Venturia inaequalis* on apples, *Cladosporium fulvum* on tomatoes, *Phytophthora infestans* on tomatoes, *Plasmopora viticola* on vines, *Septoria apii* on celery and *Botrytis fabae* on broad beans. Some typical results are shown in Table VI. (Figures indicate percent control.)

Table VI

| Fungus | V.I. | | P.I. | C.F. | | | P.V. | | S.A. | | B.F. |
|---|---|---|---|---|---|---|---|---|---|---|---|
| Type of test | Routine | P-3 | P-4 | P-4 | E+4 | P-3 | E+1 | Routine | P-4 | P-3 | P-1 |
| Concentration, percent | 0.05 | 0.05 | 0.05 | 0.05 | 0.05 | 0.05 | 0.05 | 0.05 | 0.05 | 0.05 | 0.05 |

$$NO_2\text{-}\underset{NO_2}{\bigcirc}\text{-}SO_n\text{-}R$$

| R | n | | | | | | | | | | | |
|---|---|---|---|---|---|---|---|---|---|---|---|---|
| n-pentyl | 2 | 100 | 93 | 100 | 63.3 | 32.5 | 99.4 | 83.4 | 99.7 | 91.5 | 73.5 | 92.8 |
| iso-butyl | 2 | 100 | 99 | 100 | 86 | 25.5 | 94.3 | 74.5 | 98.7 | 94.4 | 87.2 | 95.3 |
| p-tolyl | 1 | 100 | 80 | 100 | 65.6 | 28.1 | 92.8 | 52.2 | 99.6 | 73.5 | 83.9 | 97.3 |
| p-methoxy-carbonylphenyl | 1 | 100 | 97 | 100 | 55 | 49.2 | 100 | 84.6 | 97.8 | 94.4 | 85.4 | 86.2 |
| Captan [1] | | 100 | 99 | | | | | | | | | |
| Zineb [2] | | | | 100 | 60 | 27.5 | 76.7 | 72.7 | | | | |
| Copper oxychloride [3] | | | | | | | | | | 89.4 | 73.8 | |

[1] Used at the standard rate of 1 lb. active ingredient/100 gal.
[2] Used at the standard rate of 1.4 lb. active ingredient/100 gal.
[3] Used at the standard rate equivalent to 0.38 lb. copper/100 gal.
V.I. = *Venturia inaequalis*. P.V. = *Plasmopora viticola*.
P.I. = *Phytophthora infestans*. S.A. = *Septoria apii*.
C.F. = *Cladosporium fulvum*. B.F. = *Botrytis fabae*.

The following non-limitative examples illustrate the invention:

EXAMPLE 1

In the preparation of a dusting powder, 5 parts by weight of isobutyl, 2,4-dinitrophenyl sulphone were intimately mixed with 95 parts by weight of kaolin and the mixture subjected to hammer-milling.

EXAMPLE 2

In the preparation of a dispersible powder, 20 parts by weight of p-chlorophenyl 2,4-dinitrophenyl sulphoxide were intimately mixed with 8 parts by weight of Belloid T.D. (a proprietary dispersing agent—a condensate of formaldehyde and an alkylaryl sulphonate) and 72 parts by weight of kaolin, and the mixture hammer-milled. This composition forms an aqueous dispersion of active ingredient or dilution with water.

EXAMPLE 3

Dispersible powders were prepared by hammer-milling the following mixtures (parts by weight).

| | Percent |
|---|---|
| (a) Isobutyl 2,4-dinitrophenyl sulphone | 50 |
| Belloid T.D. | 3 |
| Nansa S (a proprietary wetting agent, the sodium salt of an alkylarylsulphonic acid) | 2 |
| Kaolin to 100%. | |
| (b) Isobutyl 2,4-dinitrophenyl sulphone | 50 |
| Belloid T.D. | 2 |
| Ethylan C.P. (a proprietary wetting agent, a polyethylene oxide condensate of octylphenol | 0.5 |
| Kaolin to 100%. | |
| (c) Isobutyl 2,4-dinitrophenyl sulphone | 50 |
| Tween 60 (a proprietary dispersing agent, a polyoxyethylene derivative of sorbitan monostearate) | 2 |
| Ethylan C.P. | 0.5 |
| Kaolin to 100%. | |
| (d) Isobutyl 2,4-dinitrophenyl sulphone | 50 |
| Tween 60 | 2.5 |
| Kaolin to 100%. | |
| (e) Isobutyl 2,4-dinitrophenyl sulphone | 50 |
| Tween 60 | 2 |
| Ethylan C.P. | 0.5 |
| Natrosol 250 (a hydroxyethylcellulose) | 2 |
| Ground silica to 100%. | |
| (f) Isobutyl 2,4-dinitrophenyl sulphone | 50 |
| Tween 60 | 2 |
| Ethylan C.P. | 0.5 |
| Colloidal silicic acid | 10 |
| Kaolin to 100%. | |
| (g) Isobutyl 2,4-dinitrophenyl sulphone | 50 |
| Belloid T.D. | 3 |
| Nansa S | 2 |
| Bentonite | 10 |
| Kaolin to 100%. | |
| (h) n-Pentyl 2,4-dinitrophenyl sulphone | 25 |
| Belloid T.D. | 8 |
| Nansa S | 2.5 |
| Kaolin to 100%. | |
| (i) Isobutyl 2,4-dinitrophenyl sulphone | 50 |
| Tween 60 | 1 |
| Nansa S | 1 |
| Kaolin to 100%. | |
| (j) Isobutyl 2,4-dinitrophenyl sulphone | 50 |
| Ethylan C.P. | 1 |
| Kaolin to 100%. | |

Compositions similar to those described in Examples 1–3 were prepared using as active ingredient other compounds hereinbefore listed.

EXAMPLE 4

In the preparation of a composition suitable for dilution with water to produce a stable emulsion, the following ingredients were mixed.

| | Percent |
|---|---|
| (a) n-Pentyl 2,4-dinitrophenyl sulphone | 20 |
| Arylan C.A. (calcium dodecylbenzene sulphonate) | 5 |
| Ethylan B.V. (an octylphenylpolyethylene oxide condensate) | 5 |
| Toluene to 100%. | |
| (b) 2,4-dinitrophenyl phenyl sulphoxide | 4 |
| Insem 108 (an oleic acid ester of a glycol) | 10 |
| Benzene to 100%. | |
| (c) Isobutyl 2,4-dinitrophenyl sulphone | 16 |
| Arylan C.A. | 2.5 |
| Ethylan B.V. | 2.5 |
| Isophorone/xylene blend (30:70) to 100%. | |

In so far as solubility in suitable solvents allowed, similar compositions were made using other active ingredients herenbefore listed.

EXAMPLE 5

In the preparation of a composition suitable for generation as an aerosol by mechanical means, the following were mixed:

| | Percent |
|---|---|
| Isobutyl 2,4-dinitrophenyl sulphone | 20 |

A mixture of acetone (95%) and arachis oil (5%) to 100%.

We claim:
1. A fungicidal composition in a form suitable for dilution with water to produce an aqueous spraying liquid comprising as an active fungicidal ingredient a particulate compound of the formula

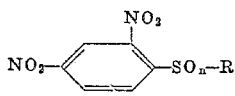

in which n is 1–2 and (a) when n=1, R is selected from the group consisting of alkyl containing 5–7 carbons, lower cycloalkyl, phenyl lower alkyl, phenyl lower alkyl in which the phenyl nucleus contains a substituent selected from the group consisting of halogen and nitro, phenyl, and phenyl which contains a substituent selected from the group consisting of halogen, nitro, lower alkyl, lower alkoxy and lower alkoxycarbonyl; (b) when n=2, R is selected from the group consisting of lower alkyl, methyl containing a halogen substituent, propyl containing a halogen substituent, lower cycloalkyl, phenyl lower alkyl, and phenyl lower alkyl in which the phenyl nucleus contains a substituent selected from the group consisting of halogen and nitro; in association with a dispersing agent, at least 95% of the particles of said compound having a size less than 50μ.

2. A fungicidal composition in a form suitable for dilution with water to produce an aqueous spraying liquid, comprising as an active ingredient a particulate compound of the formula

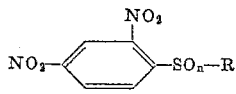

in which n is 1–2 and (a) when n=1, R is selected from the group consisting of alkyl containing 5–7 carbons, lower cycloalkyl, phenyl lower alkyl, phenyl lower alkyl in which the phenyl nucleus contains a substituent selected from the group consisting of halogen and nitro, phenyl, and phenyl which contains a substituent selected from the group consisting of halogen, nitro, lower alkyl, lower alkoxy and lower alkoxycarbonyl; (b) when n=2, R is selected from the group consisting of lower alkyl, methyl containing a halogen substituent, propyl containing a halogen substituent, lower cycloalkyl, phenyl lower alkyl, and phenyl lower alkyl in which the phenyl nucleus contains a substituent selected from the group consisting of halogen and nitro; in association with a dispersing agent and a pulverulent solid diluent, at least 95% of the particles of said compound having a size less than 50μ.

3. A fungicidal composition in a form suitable for dilution with water to produce an aqueous spraying liquid, comprising as an active ingredient a particulate compound of the formula

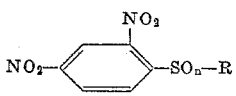

in which n is 1–2 and (a) when n=1, R is selected from the group consisting of alkyl containing 5–7 carbons, lower cycloalkyl, phenyl lower alkyl, phenyl lower alkyl in which the phenyl nucleus contains a substituent selected from the group consisting of halogen and nitro, phenyl, and phenyl which contains a substituent selected from the group consisting of halogen, nitro, lower alkyl, lower alkoxy and lower alkoxycarbonyl; (b) when n=2, R is selected from the group consisting of lower alkyl, methyl containing a halogen substituent, propyl containing a halogen substituent, lower cycloalkyl, phenyl lower alkyl, and phenyl lower alkyl in which the phenyl nucleus contains a substituent selected from the group consisting of halogen and nitro; in association with a dispersing agent and a sticker, at least 95% of the particles of said compound having a size less than 50μ.

4. A fungicidal composition in the form of a dusting powder, comprising as an active ingredient a particulate compound of the formula

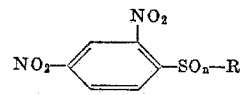

in which n is 1–2 and (a) when n=1, R is selected from the group consisting of alkyl containing 5–7 carbons lower cycloalkyl, phenyl lower alkyl, phenyl lower alkyl in which the phenyl nucleus contains a substituent selected from the group consisting of halogen and nitro, phenyl, and phenyl which contains a substituent selected from the group consisting of halogen, nitro, lower alkyl, lower alkoxy and lower alkoxycarbonyl; (b) when n=2, R is selected from the group consisting of lower alkyl, methyl containing a halogen substituent, propyl containing a halogen substituent, lower cycloalkyl, phenyl lower alkyl, and phenyl lower alkyl in which the phenyl nucleus contains a substituent selected from the group consisting of halogen and nitro; in association with a pulverulent solid diluent, at least 95% of the particles of said composition having a size less than 50μ.

5. A fungicidal composition in a form suitable for dilution with water to produce an aqueous spraying liquid, comprising as an active ingredient particulate n-pentyl 2,4-dinitrophenyl sulphone in association with a dispersing agent, at least 95% of the particles of said compound having a size less than 50μ.

6. A fungicidal composition in a form suitable for dilution with water to produce an aqueous spraying liquid, comprising as an active ingredient particulate n-pentyl 2,4-dinitrophenyl sulphone in association with a dispersing agent and a pulverulent solid diluent, at least 95% of the particles of said compound having a size less than 50μ.

7. A fungicidal composition in a form suitable for dilution with water to produce an aqueous spraying liquid, comprising as an active ingredient particulate n-pentyl 2,4-dinitrophenyl sulphone in association with a dispersing agent and a sticker, at least 95% of the particles of said compound having a size less than 50μ.

8. A fungicidal composition in a form suitable for dilution with water to produce an aqueous spraying liquid, comprising as an active ingredient particulate n-pentyl 2,4-dinitrophenyl sulphone in association with a dispersing agent and, as a sticker, polyvinyl alcohol, at least 95% of the particles of said compound having a size less than 50μ.

9. A fungicidal composition in the form of a dusting powder, comprising as an active ingredient particulate n-pentyl 2,4-dinitrophenyl sulphone in association with a pulverulent solid diluent, at least 95% of the particles of said composition having a size less than 50μ.

10. A fungicidal composition in a form suitable for dilution with water to produce an aqueous spraying liquid, comprising as an active ingredient particulate p-tolyl 2,4-dinitrophenyl sulphoxide in association with a dispersing agent, at least 95% of the particles of said compound having a size less than 50μ.

11. A fungicidal composition in a form suitable for dilution with water to produce an aqueous spraying liquid comprising as an active ingredient particulate p-tolyl 2,4-dinitrophenyl sulphoxide in association with a dispersing agent and a pulverulent solid diluent, at least 95% of the particles of said composition having a size less than 50μ.

12. A method of controlling the growth of fungi on a crop which comprises treating the crop with a fungicidally effective amount of a compound of the formula

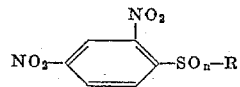

in which n is 1;2 and (a) when n=1, R is selected from the group consisting of alkyl containing 5–7 carbons, lower cycloalkyl, phenyl lower alkyl, phenyl lower alkyl in which the phenyl nucleus contains a substituent selected from the group consisting of halogen and nitro, phenyl, and phenyl which contains a substituent selected from the group consisting of halogen, nitro, lower alkyl, lower alkoxy and lower alkoxycarbonyl; (b) when n=2, R is selected from the group consisting of lower alkyl, methyl containing a halogen substituent, propyl containing a halogen substituent, lower cycloalkyl, phenyl lower alkyl, and phenyl lower alkyl in which the phenyl nucleus contains a substituent selected from the group consisting of halogen and nitro.

13. A method of controlling the growth of fungi on a crop which comprises treating the soil in which the crop is to grow with a fungicidally effective amount of a compound of the formula

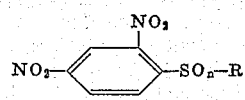

in which n is 1–2 and (a) when n=1, R is selected from the group consisting of alkyl containing 5–7 carbons, lower cycloalkyl, phenyl lower alkyl, phenyl lower alkyl in which the phenyl nucleus contains a substituent selected from the group consisting of halogen and nitro, phenyl, and phenyl which contains a substituent selected from the group consisting of halogen, nitro, lower alkyl, lower alkoxy and lower alkoxycarbonyl; (b) when n=2, R is selected from the group consisting of lower alkyl, methyl containing a halogen substituent, propyl containing a halogen substituent, lower cycloalkyl, phenyl lower alkyl, and phenyl lower alkyl in which the phenyl nucleus contains a substituent selected from the group consisting of halogen and nitro.

14. A method according to claim 12 in which said compound is applied at a rate of 0.2–100 lb. per acre.

15. A method according to claim 13 in which said compound is applied at a rate of 0.2–100 lb. per acre.

16. A method according to claim 12 in which said compound is applied to the crop at a rate of 0.5–8 lb. per acre in the form of an aqueous spray.

17. A method of controlling the growth of fungi on a crop which comprises treating the crop with a fungicidally effective amount of n-pentyl 2,4-dinitrophenyl sulphone.

18. A method of controlling the growth of fungi on a crop which comprises treating the soil in which the crop is to grow with a fungicidally effective amount of n-pentyl 2,4-dinitrophenyl sulphone.

19. A method of controlling the growth of fungi on a crop which comprises treating the crop with n-pentyl 2,4-dinitrophenyl sulphone at a rate of 0.5–8 lb. per acre.

20. A method of controlling *Venturia inaequalis* on apple trees which comprises treating the apple trees with n-pentyl 2,4-dinitrophenyl sulphone at a rate of 0.5–8 lb. per acre.

21. A method of controlling the growth of fungi on a crop which comprises treating the crop with a fungicidally effective amount of p-tolyl 2,4-dinitrophenyl sulphoxide.

22. A method of controlling the growth of fungi on a crop which comprises treating the soil in which the crop is to grow with a fungicidally effective amount of p-tolyl 2,4-dinitrophenyl sulphoxide.

References Cited by the Examiner

UNITED STATES PATENTS

| 2,557,519 | 6/51 | Skinner | 167—30 |
| 2,557,520 | 6/51 | Skinner | 167—30 |
| 2,909,457 | 10/59 | Birum | 167—30 |
| 3,050,440 | 8/62 | Richter | 167—30 |

FOREIGN PATENTS

| 1,089,206 | 9/60 | Germany. |
| 119,981 | 10/47 | Sweden. |
| 262,191 | 10/47 | Switzerland. |

OTHER REFERENCES

Chem. Abs., 39, 509(2) (1945); 51, 6625(C) (1957); 45, 1057(b) (1951); 48, 12803(e) (1954); 49, 15785(f) (1955); 50, 10691(e) (1956).

Gazz. Chim. Ital., vol. 84, pp. 73–132 (1954), p. 113 relied on.

JULIAN S. LEVITT, *Primary Examiner.*